US012731170B1

(12) United States Patent
Ghanim

(10) Patent No.: US 12,731,170 B1
(45) Date of Patent: Sep. 8, 2026

(54) ADVERTISEMENT DISPLAY SYSTEM AND METHOD THEREOF

(71) Applicant: Abdullah Ghanim, Indiana, IN (US)

(72) Inventor: Abdullah Ghanim, Indiana, IN (US)

( * ) Notice: Subject to any disclaimer, the term of this patent is extended or adjusted under 35 U.S.C. 154(b) by 0 days.

(21) Appl. No.: 19/262,149

(22) Filed: Jul. 8, 2025

(51) Int. Cl.
*G06Q 30/02* (2023.01)
*G06Q 30/0242* (2023.01)
*G06Q 30/0273* (2023.01)

(52) U.S. Cl.
CPC ..... *G06Q 30/0243* (2013.01); *G06Q 30/0245* (2013.01); *G06Q 30/0246* (2013.01); *G06Q 30/0275* (2013.01)

(58) Field of Classification Search
CPC ........... G06Q 30/0243; G06Q 30/0245; G06Q 30/0246; G06Q 30/0275
See application file for complete search history.

(56) References Cited

U.S. PATENT DOCUMENTS 8,862,500 B1 * 10/2014 Mayfield ................ G06Q 30/02 705/14.58
11,244,350 B1 * 2/2022 Soliman ............. G06Q 30/0246
2009/0009340 A1 * 1/2009 Weaver .................. G01D 21/00 340/573.1
2009/0049097 A1 * 2/2009 Nocifera ............... H04L 65/611 709/224
2009/0076890 A1 * 3/2009 Dixon .................... G06Q 30/02 705/14.25
2010/0114697 A1 * 5/2010 Athsani ............. G06Q 30/0251 705/37
2012/0150586 A1 * 6/2012 Harper ............... G06Q 30/0204 705/7.33
2020/0111119 A1 * 4/2020 Singhal ................... G01S 19/01
2021/0176578 A1 * 6/2021 Clontz, II ............. H04W 4/021
2023/0177568 A1 * 6/2023 Horton .............. G06Q 30/0244 705/14.72
2026/0141424 A1 * 5/2026 Savon ................ G06Q 30/0264

OTHER PUBLICATIONS

"Measurement and Analysis for Digital Signage" (Published by NetWorld Alliance in 2009 at www.networkdaliance.com and written by James Bickers and Dick Good) (Year: 2009).*

* cited by examiner

*Primary Examiner* — James M Detweiler
(74) *Attorney, Agent, or Firm* — S.J. INTELLECTUAL PROPERTY LTD.

(57) ABSTRACT

A computer-implemented system is provided for managing location-based digital advertising across distributed digital signage networks. It includes a client-side campaign module for inputting target demographics, budgets, and preferred locations, and a host device module for registering digital signage devices with geolocation, screen data, and occupancy metrics. A display mapping engine offers real-time, map-based visualization of signage availability. Campaigns are allocated using a non-linear optimization model that factors in device responsiveness and demographic affinity. A dynamic pricing engine calculates impression costs based on real-time traffic and engagement data, adjusting via reinforcement learning. A bidding module enables signage hosts to process and transmit bid responses with minimal latency. A centralized moderation subsystem, using a trained machine learning classifier, evaluates ad content for compliance with platform policies.

19 Claims, 8 Drawing Sheets

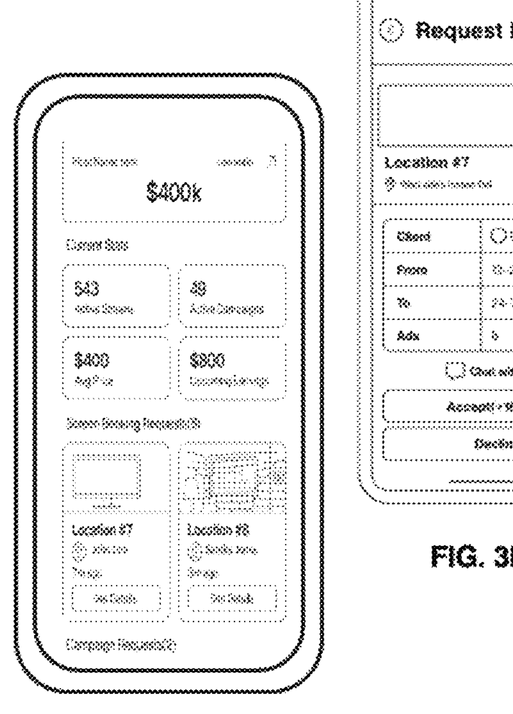
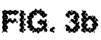
FIG. 3b
FIG. 3a
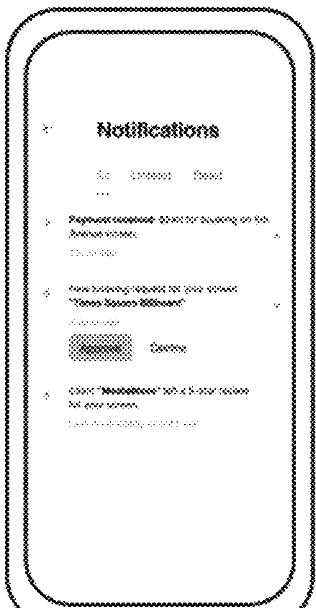
FIG. 3c

| Monthly Foot Traffic Range | Base Price |
|---|---|
| 500 – 999 | $50 |
| 1,000 – 2,499 | $65 |
| 2,500 – 4,999 | $70 |
| 5,000 – 9,999 | $85 |
| 10,000 – 19,999 | $100 |
| 20,000+ | $125 |

FIG. 5a

| Screen Size | Width (inches) | Height (inches) |
|---|---|---|
| 32" | 27.9 | 15.7 |
| 40" | 34.9 | 19.6 |
| 42" | 36.6 | 20.6 |
| 43" | 37.5 | 21.1 |
| 50" | 43.6 | 24.5 |
| 55" | 47.9 | 27 |
| 60" | 52.3 | 29.4 |
| 65" | 56.7 | 31.9 |
| 70" | 61 | 34.3 |
| 75" | 65.4 | 36.8 |
| 80" | 69.7 | 39.2 |
| 85" | 74.1 | 41.7 |

FIG. 5b

| Feature Name | Description | Multiplier |
|---|---|---|
| Sound Enabled | Screen supports audio ads | +5% (×1.05) |
| Live Analytics | Advertisers see real-time engagement | +15% (×1.15) |
| Continuous Playtime | Screen operates 16+ hrs per day | +5% (×1.05) |

FIG. 5c

| Number of Ads Supported | Seconds per Ad | Price Multiplier |
|---|---|---|
| 12 ads | 5 sec | ×1.0 |
| 10 ads | 6 sec | ×1.2 |
| 8 ads | 7.5 sec | ×1.5 |
| 6 ads | 10 sec | ×2.0 |
| 4 ads | 15 sec | ×2.5 |
| 3 ads | 20 sec | ×3.0 |

FIG. 5d

| Screen Size (inches) | Multiplier |
|---|---|
| 32" | 1.000× |
| 40" | 1.025× |
| 42" | 1.050× |
| 43" | 1.075× |
| 50" | 1.100× |
| 55" | 1.125× |
| 60" | 1.150× |
| 65" | 1.175× |
| 70" | 1.200× |
| 75" | 1.225× |
| 80" | 1.250× |
| 85" | 1.275× |

FIG. 5e

ADVERTISEMENT DISPLAY SYSTEM AND METHOD THEREOF

FIELD OF THE DISCLOSURE

The present invention relates to the field of digital advertising display systems and, more specifically, to the systems and methods for placing advertisements on electronic signage devices located in multiple retail stores, malls, and other commercial establishments.

BACKGROUND OF THE DISCLOSURE

Advertising through traditional billboards is often quite costly and also limited to fixed locations. While digital advertising has grown, there remains a gap in leveraging existing television screens and digital signage in commercial spaces to create a cost-effective, high-reach advertising network. Businesses with high foot traffic, such as grocery stores, cafes, gyms, and retail outlets, present an untapped opportunity for targeted, dynamic advertisement display.

Current digital advertising models either rely on individual store promotions or large-scale billboard advertising, both of which have limitations in terms of cost, reach, and flexibility. There exists a need for a system that allows advertisers to place their ads on multiple in-store screens dynamically, optimizing visibility based on foot traffic and store location.

The field of digital advertising has evolved significantly with the proliferation of electronic/digital signage devices in public and commercial spaces. These devices offer dynamic content delivery but face challenges in campaign targeting, real-time allocation, pricing optimization, and content moderation. Existing systems often lack integrated solutions for matching advertisements to signage locations based on real-time occupancy, demographic affinity, and performance metrics. Additionally, there is a need for automated, scalable systems that optimize advertiser engagement and host revenue while ensuring compliance with content policies.

In view of the above, the present subject matter as disclosed herein, aims to provide a system and method for placing advertisements on electronic signage devices located in multiple retail stores, malls, and other commercial establishment. The present invention addresses these challenges by providing a comprehensive system for managing location-based digital advertising across distributed signage networks.

SUMMARY

In order to provide a holistic solution to the above-mentioned limitations, it is necessary to provide a platform for dynamic advertising placement across multiple businesses using electronic signage devices, digital indoor advertising screens.

An object of the present disclosure is to provide a cost-effective alternative to traditional billboard advertising that are complicated and expensive.

Another object of the present disclosure is to leverage high-traffic commercial locations for targeted advertisement placement.

Another object of the present disclosure is to allow store owners to monetize their in-store digital screens by displaying third-party advertisements.

Another object of the present disclosure is to enable remote control and dynamic updating of advertisement content.

Another object of the present disclosure is to create segmented advertising portfolios based on store type, location, and customer demographics.

According to an embodiment of the present disclosure, there is provided a computer-implemented system for managing location-based digital advertising across a distributed network of digital signage devices. The system comprises a client-side campaign management module, executable on a user device, configured to receive and transmit advertising campaign parameters including target demographics, budget constraints, and preferred locations; a host device registration module, executable on a signage host device, configured to register a digital signage device by transmitting a device identifier, geolocation data, screen specifications, and occupancy sensor data to a central server; a geolocation-based display mapping engine, configured to render, on a graphical user interface, a map-based visualization of available signage devices based on real-time occupancy status and location metadata; a campaign allocation engine, comprising a non-transitory memory storing instructions and a processor configured to: analyse incoming campaign parameters; retrieve real-time availability and historical viewer impression data from the digital signage devices; match campaigns to the digital signage devices using a non-linear optimization model that accounts for device-specific responsiveness and demographic affinity scores; a dynamic pricing engine, further configured to: calculate a per-impression cost based on real-time traffic density derived from a plurality of sources, the plurality of sources include but not limited to occupancy sensors, historical engagement analytics, and predictive AI models; autonomously adjust pricing thresholds using reinforcement learning algorithms to optimize for advertiser engagement and host yield; a bidding module, operable on the signage host device, configured to: receive bid requests in real time; locally pre-process occupancy and engagement signals; transmit filtered bid responses to the central server with minimal latency; and a centralized moderation subsystem, including a machine learning classifier trained on historical rejection data, configured to automatically approve or flag campaign placements based on content policy compliance.

According to an embodiment of the present disclosure, the campaign allocation engine further comprises a budget and reach tracker configured to update in real-time as display locations are selected by a client user.

According to an embodiment of the present disclosure, the centralized moderation subsystem is further configured to prevent host and client account transactions without administrative approval, and to perform automated pre-screening of content using rule-based filters or AI-based moderation algorithms prior to said approval.

According to an embodiment of the present disclosure, the map-based display engine further comprises a list view toggle, sort functionality based on traffic data, host ratings, or pricing, and a heatmap visualization overlay to assist in identifying optimal signage locations based on user-defined filtering criteria.

According to an embodiment of the present disclosure, the system further comprises an inventory optimization module configured to reprioritize signage locations in real-time based on live engagement metrics, the reprioritization comprising modifying bidding visibility, display frequency, or featuring high-performing signage more prominently based on host incentives, subscription tiers, or system-determined performance thresholds.

According to an embodiment of the present disclosure, the system comprises an inventory optimization module configured to reprioritize signage locations in real time based on live engagement metrics, wherein the reprioritization includes adjusting bidding visibility or display frequency, and optionally featuring high-performing or compensated host screens more prominently, including on the home page or top results, based on factors such as, but not limited to, additional fees, subscriptions, incentives, and other forms of compensation or platform-determined criteria.

According to an embodiment of the present disclosure, the system further comprises a performance feedback module configured to correlate sensor-derived foot traffic data with campaign interaction events to compute engagement performance metrics.

According to an embodiment of the present disclosure, the dynamic pricing engine is further configured to calculate an advertisement slot cost based on one or more host-defined parameters including but not limited to screen size, ad display capacity, screen location, and historical or real-time performance data, and to enable optional host-defined custom pricing per slot.

According to an embodiment of the present disclosure, the real-time bidding module allocates advertisement slots based on predefined criteria including but not limited to bid value, campaign relevance to display location, and slot availability.

According to an embodiment of the present disclosure, attribution metrics for each signage location include but not limited to time-synced occupancy data, advertisement display logs, user engagement events including QR code scans and mobile interactions, and other measurable indicators, and wherein said metrics are aggregated to compute a campaign-specific engagement score.

According to an embodiment of the present disclosure, the host user device prompts host users during signage registration to input demographic characteristics of the typical viewer base including but not limited to age group, gender, ethnic profile, occupation, and income level, and wherein said data is used to generate a demographic profile and diversity score for the signage location.

According to an embodiment of the present disclosure, the client user device comprises a filtering guide enabling campaign targeting based on demographic profiles and diversity scores, and wherein clients are enabled to adjust location selection preferences based on desired audience traits or diversity parameters.

According to an embodiment of the present disclosure, the host user device includes a structured lead submission tool configured to allow host users to propose campaign-relevant leads to clients, and further configured to facilitate client-generated feedback, including tips or reviews, based on the quality or usefulness of the submitted leads.

According to an embodiment of the present disclosure, the client user device further comprises a campaign cart that tracks the cumulative estimated cost and impression count of selected signage locations.

According to an embodiment of the present disclosure, the system comprises a hardware device integrated with a network interface and a digital display controller, the hardware device further including an occupancy tracking subsystem configured to collect foot traffic data using at least radar-based detection, and wherein the hardware device enables remote content control and local performance data acquisition.

According to an embodiment of the present disclosure, the advertisement display frequency is dynamically adjusted based on real-time foot traffic data captured by the occupancy tracking subsystem.

According to an embodiment of the present disclosure, a location analytics module configured to collect and process data indicative of return visitor rates, demographic breakdowns, and traffic trends at each signage location.

According to an embodiment of the present disclosure, the client user device includes graphical tools comprising draw-to-select and multi-tap functionality for bulk selection of signage locations on the display map.

According to an embodiment of the present disclosure, user-submitted advertisement content is processed using pattern recognition models to predict viewer engagement levels and estimated reach.

According to an embodiment of the present disclosure, the system comprising an AI-based recommendation engine configured to analyse campaign parameters including budget, impression targets, and audience preferences, and to generate prioritized signage location suggestions aligned with optimal viewer profiles or campaign goals.

According to an embodiment of the present disclosure, the advertiser selections, performance results, and bidding history are presented via an interactive campaign dashboard comprising real-time metrics and visual analytics.

In one embodiment, the system implements a computer-implemented method for calculating an advertisement price for campaign deployment across a distributed network of digital signage screens. The method is initiated via a graphical user interface rendered on the client user device, through which the advertiser inputs a set of campaign configuration parameters. These include a predefined foot traffic range corresponding to the selected signage location, a screen size category, a desired advertisement slot density (number of ads per minute), and one or more optional advertising features (e.g., sound enablement, real-time analytics, continuous playback). Upon receiving these selections, the system retrieves associated values from lookup tables stored in server-accessible memory. Specifically, it fetches a base traffic price linked to the selected foot traffic range, a screen size multiplier, and an ad density multiplier. For each optional feature, a percentage-based cost increment is applied, and a cumulative feature multiplier is calculated as 1 plus the sum of selected feature percentages.

The afore-mentioned objectives and additional aspects of the embodiments herein will be better understood when read in conjunction with the following description and accompanying drawings. It should be understood, however, that the following descriptions, while indicating preferred embodiments and numerous specific details thereof, are given by way of illustration and not of limitation. This section is intended only to introduce certain objects and aspects of the present invention, and is therefore, not intended to define key features or scope of the subject matter of the present invention.

BRIEF DESCRIPTION OF THE DRAWINGS

The figures mentioned in this section are intended to disclose exemplary embodiments of the claimed system and method. Further, the components/modules and steps of a process are assigned reference numerals that are used throughout the description to indicate the respective components and steps. Other objects, features, and advantages of the present invention will be apparent from the following description when read with reference to the accompanying drawings.

FIGS. 3*a*-3*e* illustrate various dashboard interfaces displayed on the host user devices, according to an exemplary embodiment of the present invention disclosure.

FIGS. 5*a-e* illustrate calculation of an advertisement price across a distributed network of digital signage screens, according to an exemplary embodiment of the present invention disclosure.

Like reference numerals refer to like parts throughout the description of several views of the drawings.

Reference Numeral List

Figure 1:
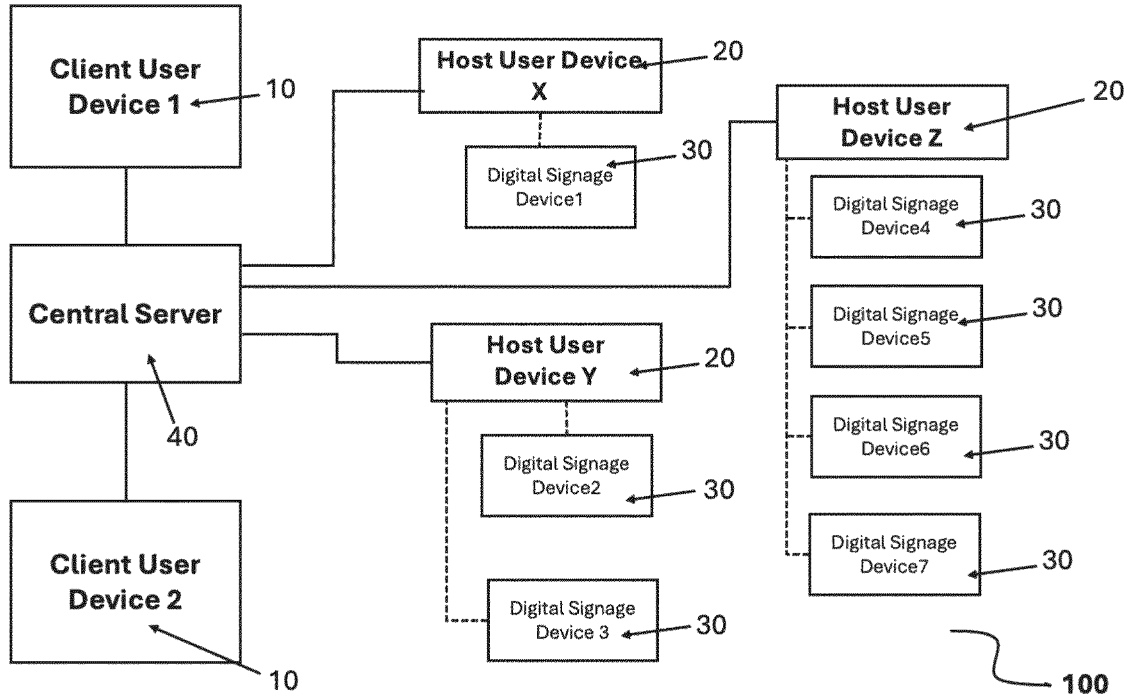
FIG. 1 illustrates basic architecture of an advertisement display system, according to an exemplary embodiment of the invention disclosure.

| Ref. No. | Component Name | Description |
|---|---|---|
| 10 | Client User Device | A computing device operated by an advertiser or client. May include smartphones, laptops, tablets, or desktops. Executes the client-side campaign management module and provides access to the graphical user interface for campaign planning. |
| 20 | Host User Device | A computing device operated by a signage provider or host, used to register digital signage units using a host-device registration module and thereby manage content. May be a laptop, desktop, electronic tablet device, or signage controller etc. |
| 30 | Digital Signage Device | A network-connected electronic display device located in physical spaces (e.g., malls, airports, streets) for rendering digital advertisements. Each digital signage device/unit is registered and controlled via a corresponding host device. |
| 40 | Central Server | A cloud-based or centralized computing resource that coordinates campaign management, data processing, and real-time communication across client and host devices. Hosts several software modules including geolocation-based mapping engine, pricing engine, campaign allocation engine, bidding engine, and moderation subsystem. |
| 50 | Moderation Layer | Enforces operational constraints by preventing transactional actions, such as booking confirmations or content publication between hosts and clients unless moderation clearance has been granted. |
| 60 | Screen Library | Screen Library, which is a repository or data module comprising metadata associated with each digital signage screen registered within the advertising network. Each entry in the Screen Library encapsulates key screen-specific parameters that are used in pricing, scheduling, and content optimization processes. |
| 70 | Review and Tip Module | Enables advertisers and campaign planners to view historical performance feedback, system-generated suggestions, and user-provided insights for optimizing campaign outcomes. This module may present data visualizations, feedback summaries, or AI-generated tips based on past advertising trends, viewer interactions, and campaign configurations. It functions as a decision-support tool, helping users refine campaign strategies through actionable advice. |
| 80 | Performance Tracker | A real-time and historical analytics module that monitors the effectiveness of ad campaigns deployed across various signage units. This module aggregates data such as impressions, dwell time, engagement rates (if live analytics are enabled), and conversion estimates. The system may use this tracker to evaluate whether the selected pricing parameters and display configurations yielded the expected audience reach and impact. |
| 90 | Budget & Reach Tracker | A projection and monitoring module that dynamically correlates the advertiser's budget with the estimated audience reach based on selected locations, screen sizes, ad durations, and feature enhancements. Upon each parameter update, this module calculates the remaining budget, expected impressions, and cost efficiency, ensuring that advertisers remain within their financial constraints while maximizing exposure. |
| 100 | System | A computer-implemented system that is configured to manage location-based digital advertising across a distributed network of digital signage devices. |
| 110 | Filter Module | Allows users to refine and narrow down available signage options based on custom criteria such as screen size, traffic volume, pricing tier, feature support (e.g., sound, live analytics), and operational hours. This module improves usability and efficiency by helping advertisers identify the most suitable screens within a large inventory, aligned with campaign objectives. |
| 120 | Mix & Match Locations Map Module | Provides an interactive geographical interface that enables advertisers to select and combine multiple advertising locations based on campaign goals. Using geospatial data and foot traffic |

-continued

| Reference Numeral List | | |
|---|---|---|
| Ref. No. | Component Name | Description |
| | | analytics, the module facilitates location comparisons, cluster targeting, and diversity in audience exposure. It supports selection based on region, traffic profile, demographics, or screen type to craft highly localized and impact-driven campaigns. |
| 130 | Pricing Engine | A computational component that calculates the final cost of advertising campaigns. It uses user-selected parameters such as foot traffic bracket, screen size, ad count, and optional features to retrieve corresponding values from pre-defined lookup tables. The engine applies a multiplicative formula to compute the total campaign cost, delivering real-time pricing feedback through the client interface. |
| 140 | Real-Time Bidding Module | Enables competitive, auction-based pricing for high-demand signage slots. Advertisers may place bids for specific time blocks, screens, or locations, and the system dynamically allocates ad slots based on highest bids and campaign priorities. The RTB module interfaces with the Pricing Engine and Performance Tracker to ensure fair valuation and efficient allocation of premium inventory. |
| 150 | Campaign Allocation Engine | A campaign allocation engine, stored in the memory and executed by the processor of the central server, is configured to analyse incoming campaign parameters and match campaigns to signage devices using a non-linear optimization model. |

DETAILED DESCRIPTION OF THE INVENTION

This section is intended to provide explanation and description of various possible embodiments of the present invention. The embodiments used herein, and various features and advantageous details thereof are explained more fully with reference to non-limiting embodiments illustrated in the accompanying drawings and detailed in the following description. The examples used herein are intended only to facilitate an understanding of ways in which the embodiments herein may be practiced and to further enable the person skilled in the art to practice the embodiments used herein. Also, the examples/embodiments described herein should not be construed as limiting the scope of the embodiments herein. Corresponding reference numerals indicate corresponding parts throughout the drawings.

The present invention discloses a system and method for displaying advertisements across a network of electronic signage devices installed in multiple retail stores and commercial spaces. The system enables one or more advertisers to purchase advertisement slots, which are then displayed on available screens according to a predetermined schedule and foot traffic analysis. The invention enables business owners to offer their in-store digital displays as advertising space, forming a decentralized network of available ad inventory. Advertisers can browse and select display locations based on factors such as geography, audience, and pricing, then deploy content remotely. The system handles device registration, content delivery, scheduling, billing, and performance analytics, creating an organized and scalable method for connecting advertisers with independently hosted display platforms.

As used herein, ‘AI-module’ is an artificial intelligence enabled device or module, that is capable of processing digital logics and possesses analytical skills for analyzing and processing various data or information, according to the embodiments of the present invention.

As used herein, ‘database’ refers to a local or remote memory device; docket systems; storage units; each capable to store information including, advertisement data, customer profiles, user profiles and related information, metadata, predefined parameters, summary notes, historical data, etc. In an embodiment, the storage unit may be a database server, a cloud storage, a remote database, a local database.

As used herein, ‘user device’ is a smart electronic device capable of communicating with various other electronic devices and applications via one or more communication networks. The user device comprises: an input unit to receive one or more input data; an operating system to enable the user device to operate; a processor to process various data and information; a memory unit to store initial data, intermediary data and final data; and an output unit having a graphical user interface (GUI). Particularly, the user interface for the advertisers encompasses a web application or mobile application (‘app’) that allows advertisers to upload, schedule, and monitor their ad campaigns. The user devices include client user devices and host user devices.

As used herein, ‘module’ or ‘unit’ refers to a device, a system, a hardware, a computer application configured to execute specific functions or instructions according to the embodiments of the present invention. The module or unit may include a single device, or multiple devices configured to perform specific functions according to the present invention disclosed herein.

As used herein, ‘advertisers’ or ‘client users’ refers to individual human clients, companies, entities or any confirmed body willing to place a representative advertisement on the system. Advertisers purchase slots via the system to display their advertisements to the audiences and store visitors. The advertisers or the clients use respective ‘client user devices’.

As used herein, ‘hosts’ or ‘host users’ refers to any entity, humans or companies, who own the medium at which an advertiser is paying to place their advertisement at. The hosts use ‘host user devices’.

Terms such as ‘connect’, ‘integrate’, ‘configure’, and other similar terms include a physical connection, a wireless connection, a logical connection or a combination of such connections including electrical, optical, RF, infrared, Bluetooth, or other transmission media, and include configuration of software applications to execute computer program instructions, as specific to the presently disclosed embodiments, or as may be obvious to a person skilled in the art. The system uses the internet or local network connectivity to distribute advertisements seamlessly to connected signage devices.

Terms such as 'send', 'transfer', 'transmit' and 'receive', 'collect', 'obtain', 'access' and other similar terms refers to transmission of data between various modules and units via wired or wireless connections across a communication network. The 'communication network' includes a local area network (LAN), a wide area network (WAN), a metropolitan area network (MAN), a virtual private network (VPN), an enterprise private network (EPN), Internet, cloud-based network, and a global area network (GAN).

Figure 2:
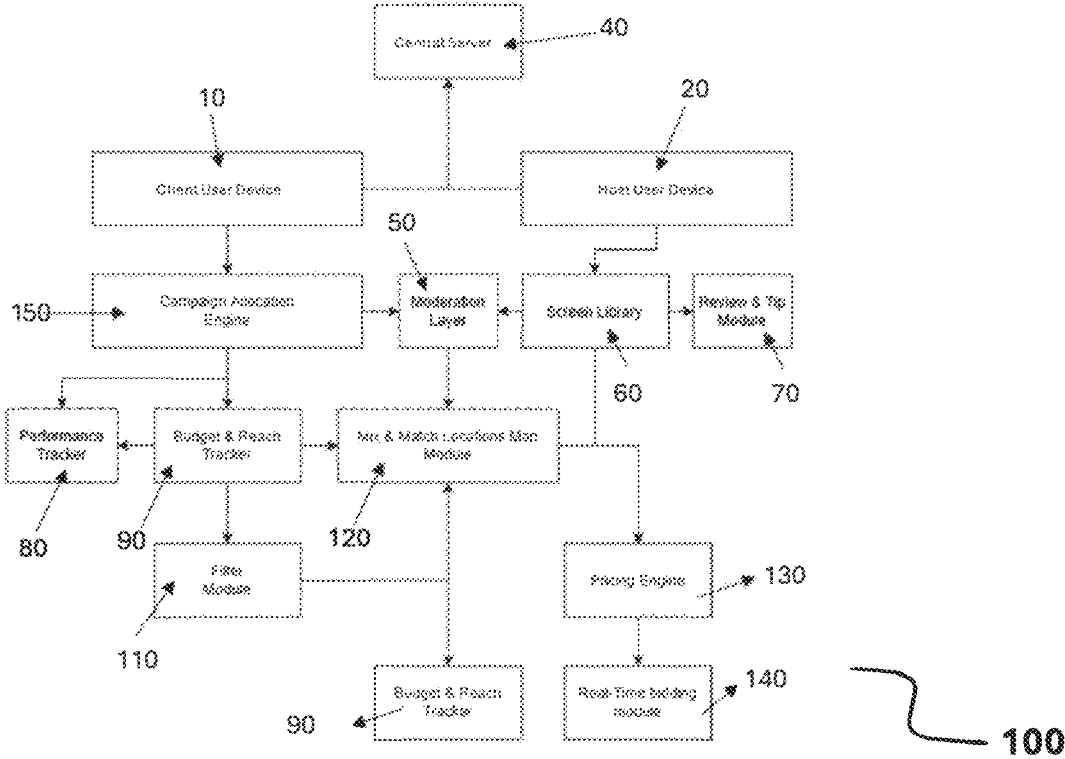
FIG. 2 illustrates detailed architecture of the advertisement display system, according to an exemplary embodiment of the invention disclosure.

FIG. 1-2 illustrates a block diagram of an exemplary architecture of a computer-implemented system (100) for managing location-based digital advertising across a distributed network of digital signage devices (30), in accordance with one embodiment of the present disclosure. The system (100) comprises a central server (40) configured to execute a client-side campaign management module and a host device registration module, respectively via a plurality of client user devices (10) and a plurality of host user devices (20) across a communication network. The plurality of host user devices (20) is configured to correspondingly manage one or more digital signage devices (30) that are distributed over a geographical location. The central server (40) has a geolocation-based display mapping engine, a campaign allocation engine (150), a dynamic pricing engine (130), a bidding module (140) and a centralised moderation subsystem, along with other modules to manage the location-based digital advertising.

As shown in FIG. 1, the system (100) comprises the plurality of client user devices (10) (labelled as Client User Device 1 and Client User Device 2, each referenced by numeral (10)), the central server (40), the plurality of host user devices (20) (labelled as Host User Device X, Y, and Z, each referenced by numeral 20), and the plurality of digital signage devices (30), which are operatively connected to their respective host user devices (20). Thus, the system (100) is implemented using a combination of client user devices (10), host user devices (20), communication networks, servers, and cloud infrastructure, thereby ensuring tangible execution through concrete technological means. The various components of the system (100) is discussed in detail below.

The central server (40) is connected to each of the client user devices (10) and host user devices (20) via the communication network. The communication network may include one or more of the Internet, wireless networks (e.g., Wi-Fi, LTE, 5G), or wired networks, and facilitates bi-directional data exchange among the components of the system (100).

Each digital signage device (30) is managed by an associated host user device (20), such that host user devices (20) act as intermediaries between the signage hardware (digital signage device) and the central server (40). For instance, Host User Device X manages Digital Signage Device 1, Host User Device Y manages Digital Signage Devices 2 and 3, and Host User Device Z manages Digital Signage Devices 4 through 7. Each host user device may comprise a processor, memory, display interface, network interface, and local storage, and may be implemented as a mobile phone, tablet, laptop, or a dedicated signage controller unit. Likewise, each client user device (10) may comprise a processor, memory, display interface, network interface, and local storage, and may be implemented as a mobile phone, tablet, laptop, or a dedicated signage controller unit.

The client-side campaign management module is executed on each client user device (10). This module allows advertisers or campaign managers to input and transmit campaign parameters, such as target demographics, budget constraints, location preferences, and campaign duration, to the central server (40). The central server (40), which may be cloud-hosted or on-premise, includes a plurality of functional engines and subsystems implemented in software or firmware, executed by one or more processors, and stored in non-transitory machine-readable media. These include:

According to an embodiment of the present invention, the host device registration module is configured for registering multiple digital signage devices (30) with geolocation, screen data, and occupancy metrics. The display mapping engine offers real-time, map-based visualization of signage availability. Preferably, the campaigns are allocated using a non-linear optimization model that factors in device responsiveness and demographic affinity. The dynamic pricing engine (130) calculates impression costs based on real-time traffic and engagement data, adjusting via reinforcement learning. The bidding module (140) enables signage hosts to process and transmit bid responses with minimal latency. The centralized moderation subsystem, using a trained machine learning classifier, evaluates ad content for compliance with platform policies.

In one embodiment, the one or more client devices (10), include mobile phones, laptops, tablets, or desktop computers, each comprising at least a display screen, keyboard or touchscreen input, network interface, memory, and a processor unit (CPU). These client devices are configured to execute the client-side campaign management module, stored in non-transitory computer-readable media, which is adapted to receive, process, and transmit advertising campaign parameters. These parameters may include target demographic profiles, campaign budgets, preferred geolocations, and scheduling preferences.

On the server side, the system (100) includes a cloud-based or dedicated central server (40) comprising a processor (e.g., CPU), memory, storage, and optionally a graphics processing unit (GPU) to enable high-speed rendering of graphical dashboards. The central server (40) is connected to a communication network, which may include wired and/or wireless Internet connections, enabling bidirectional communication between the server (40) and the distributed client and host user devices.

As mentioned earlier, the host user devices are associated with digital signage units, each of which includes a display screen, local processor, network connectivity module, and optionally an occupancy sensor (e.g., PIR, camera-based, or radar-based). The host device registration module, executable on each host device, is configured to register the digital signage device (30) with the central server (40) by transmitting a unique device identifier, geolocation coordinates (retrieved via onboard GPS or IP-based location data), screen specifications, and real-time occupancy data.

A geolocation-based display mapping engine, residing on the central server (40) and operable via the client device's web interface or application interface, renders a graphical user interface (GUI)—preferably on a dashboard powered by GPU acceleration—for displaying available signage locations in a real-time, map-based visualization. This engine dynamically updates device availability and audience data to assist campaign managers in planning and allocation.

The campaign allocation engine (150) is stored in the memory associated with the server (40) and executed by the processor of the central server (40), is configured to analyse incoming campaign parameters and match campaigns to signage devices using a non-linear optimization model. This model takes into account real-time signage availability, historical viewer impression statistics, device responsiveness scores, and location-specific demographic affinity data.

To manage cost-effectiveness and monetization, a dynamic pricing engine (130) is integrated into the central server (40) of the system (100). This pricing engine (130) calculates per-impression costs using real-time traffic density and audience engagement data, derived from occupancy sensors, historical analytics, and predictive AI models. A reinforcement learning algorithm operates within this module to autonomously adjust pricing thresholds over time, optimizing for both advertiser return on investment (ROI) and signage host yield.

The host devices configures the bidding module, to be executable on their local processors, which is configured to receive bid requests from the central server (40) in real time. This module locally pre-processes occupancy and engagement signals using lightweight algorithms and transmits filtered bid responses back to the central server (40) with minimal latency via a network interface.

To ensure compliance with content standards, a centralized moderation subsystem is incorporated within the server infrastructure. This subsystem includes a machine learning classifier, trained on historical data of rejected or flagged advertisements. The classifier automatically evaluates new ad creatives for compliance with platform-specific content policies and either approves or flags the content for manual review.

The system (100) is further configured to provide real-time dashboards and analytics interfaces via the client device's screen, enabling campaign managers to visualize performance metrics, device utilization, and cost efficiency.

In various embodiments, the disclosed system (100) builds upon the foundational architecture illustrated in FIG. 1-2, providing an integrated and intelligent platform for managing location-based digital advertising through a distributed network of digital signage devices (30). As previously described, the system (100) comprises client user devices 10, host user devices (20), the central server (40), and a communication network that interconnects these entities. The system (100) enables real-time campaign orchestration by employing a plurality of modules that interact across hardware and software layers/modules.

Each client user device (10), such as a laptop, tablet, or smartphone, executes a client-side campaign management module configured to collect advertising parameters from users. These parameters may include budget constraints, target demographics, scheduling preferences, and geographic priorities. As the client-user (advertiser) selects signage locations for deployment, a budget and reach tracker integrated within the campaign allocation engine (150) updates campaign status in real-time. This component dynamically adjusts projections for impression count and total budget usage, thereby guiding campaign planning without requiring manual recalculation.

The host user devices (20) are used by signage providers to register digital signage assets with the system (100). During registration, the host interface prompts users to supply metadata about each signage location, including technical specifications of the display, geolocation coordinates, and optionally, demographic details of the typical viewing audience. These characteristics may include age distribution, gender ratios, occupational segments, and socioeconomic classifications. This information is used to construct a demographic profile and diversity score for each signage unit. On the client side, a filtering assistant allows advertisers to selectively target signage locations that match their desired audience characteristics or diversity objectives.

The central server (40), connected via the communication network to both client and host devices, acts as the operational backbone of the system (100). The server (40) includes a geolocation-based display mapping engine that renders an interactive graphical user interface (GUI) for clients. This interface not only displays the geographic distribution of available signage but also supports advanced interaction features such as toggling between map and list views, sorting based on host ratings or traffic volume, and overlaying heatmaps that visualize audience density and signage performance. The GUI further includes tools such as draw-to-select and multi-tap functionality, enabling users to select multiple signage locations simultaneously, thereby streamlining large-scale campaign deployment.

When a campaign is initiated, the central server (40) invokes the campaign allocation engine (150), which retrieves the advertiser's input parameters and matches them against signage profiles using a non-linear optimization model. This model considers factors such as historical performance, demographic affinity, traffic density, and bid competitiveness. The allocation engine (150) also considers real-time engagement metrics to reprioritize signage locations dynamically. For instance, if a signage unit demonstrates a spike in foot traffic or higher engagement, its visibility may be increased on the client dashboard, and its slot may be featured more prominently within platform recommendations. Such reprioritization may also be influenced by host subscription tiers, incentive schemes, or promotional credits offered by the platform.

The dynamic pricing engine (130) configured to compute impression-level pricing using a combination of real-time sensor inputs, historical analytics, and AI-driven forecasting. Hosts may also define custom pricing parameters based on screen size, screen resolution, physical location (e.g., shopping mall, transit station), and estimated ad delivery capacity. The pricing engine (130) integrates these host-defined attributes with system (100) analytics to produce adaptive slot-level pricing, which is displayed to prospective advertisers during campaign planning.

The real-time bidding for ad slots is managed through the dedicated bidding module (140) that evaluates incoming bid requests based on predefined rules. These include bid value, relevance of the campaign to the signage audience, and temporal availability of the requested slot. The host user device (20) locally pre-processes sensor-derived inputs such as occupancy data and engagement scores and transmits optimized bid responses to the central server (40) with minimal latency. The central server (40) aggregates these responses and assigns ad placements accordingly.

To ensure the integrity and appropriateness of advertisement content, the centralized moderation subsystem on the server (40) performs automated pre-screening. It uses rule-based filtering in combination with machine learning classifiers trained on prior rejection data. Content flagged as inappropriate is either automatically rejected or forwarded for manual administrative review. Moreover, this subsystem enforces operational constraints by preventing transactional actions, such as booking confirmations or content publication between hosts and clients unless moderation clearance has been granted.

Each signage location includes a hardware controller comprising a network interface, a digital display controller, and an occupancy tracking subsystem. This subsystem typically employs radar, infrared, or visual detection techniques to measure foot traffic in the vicinity of the signage. The controller facilitates two-way communication with the central server (40), enabling remote content management and automated retrieval of performance data. The occupancy data is also used to dynamically adjust ad display frequency in real time, such that signage exposure aligns with peak traffic intervals.

The system (100) includes a performance feedback module that correlates the collected foot traffic data with user interaction events, such as QR code scans or mobile engagements, to generate real-time engagement metrics. These metrics are utilized by both the allocation engine (150) and the advertiser's dashboard (on the client user device (10)) to gauge campaign effectiveness.

To enhance host-client collaboration, the host interface of the host user devices (20) includes a structured lead submission tool. Hosts may suggest local marketing opportunities or propose co-branded initiatives relevant to client campaigns. Clients, in turn, can submit feedback such as ratings, comments, or review tags, that contribute to the host's reputation score within the platform.

The client interface also features a campaign cart module that aggregates selections made during campaign setup. It displays the cumulative estimated cost, projected impressions, and distribution parameters in real-time, providing clients with a transparent and interactive planning experience. In addition, attribution metrics such as display logs, timestamped audience data, and engagement footprints are collected and analysed to generate a campaign-specific engagement score, accessible via a visual analytics dashboard. This dashboard consolidates performance statistics, bidding history, and impression delivery data into intuitive charts and key performance indicators.

In some embodiments, the system (100) further incorporates a location analytics module that processes spatial and temporal trends, such as return visitor rates and traffic patterns across the signage network. These insights inform both advertisers and the platform itself, contributing to better targeting, pricing, and inventory management.

Finally, an AI-based recommendation engine is integrated with the campaign management module. It analyses advertiser inputs, including budget size, impression goals, and audience traits, and generates tailored signage suggestions that optimize reach and effectiveness. This ensures that campaigns are aligned with real-world audience availability and platform-wide performance data.

As shown in FIG. 2, In the illustrated system (100), a client user device (10) and a host user device (20) interface with a central server (40) to facilitate dynamic campaign planning and execution across a distributed network of digital signage displays. The client user device (10) interacts with a campaign allocation engine (150), which acts as the core orchestrator for managing advertisement requests and selecting display locations based on campaign-specific parameters. Upon receiving inputs, the campaign allocation engine (150) communicates with a budget & reach tracker (90) to compute projected reach and cost estimates, and with a performance tracker (80) that evaluates historical campaign metrics such as viewer impressions and engagement levels. A filter module (110) further assists in refining screen selections based on screen dimensions, foot traffic, and feature availability. The mix & match locations map module (120) enables geographic visualization and clustering of signage units to support multi-location advertising strategies.

The host user device (20) connects to the system (100) through a moderation layer (50), which verifies the content for compliance before accessing a screen library (60), a centralized repository of screens cataloged by size, availability, location, and capability (e.g., sound, analytics support). This screen data flows into both the mix & match locations map module (120) and the review & tip module (70), the latter providing campaign guidance and optimization suggestions based on platform intelligence and past data. Once location and feature preferences are finalized, the system (100) invokes the pricing engine (130) to compute a final campaign price using pre-defined pricing logic and lookup tables (including multipliers for foot traffic, screen size, ad duration, and features). For competitive inventory or high-demand slots, the real-time bidding module (140) can be triggered to conduct dynamic bidding and adjust pricing accordingly. Throughout this process, feedback from the budget & reach tracker (90) supports real-time cost and reach updates, ensuring transparency and effective decision-making for the advertiser.

Collectively, the system (100) provides a robust, scalable, and intelligent infrastructure for delivering targeted digital advertising in dynamic, real-world environments, leveraging a synergistic interplay of hardware components, cloud-based services, and AI-powered analytics.

FIG. 3 and FIG. 4 illustrate various dashboard interfaces displayed on the host user devices (20) and/or client user devices (10).

FIG. 3*a*-3*e* show host user device's (20) dashboard interface for campaign monitoring and booking requests. In one embodiment, the host user device (20) renders a dashboard interface that provides a real-time overview of operational and financial metrics, booking requests, and campaign participation. This interface is part of the host-side campaign management module executed on the host user device (20).

The top segment displays a summary earnings card, which is dynamically updated by the central server (40) via the dynamic pricing engine (130). This value reflects cumulative earnings accrued from approved campaign bookings, factoring in dynamic pricing adjustments and finalized bid settlements. Beneath the summary card, updated status is presented in a panel. This includes the number of active screens registered by the host, total active campaigns running across those screens, the average pricing per ad slot, and projected upcoming earnings based on pending campaign approvals. These statistics are computed by the dynamic pricing engine (130) and are refreshed in near-real-time via the central server (40) synchronization.

A key functional feature of the interface is the "screen booking requests" panel. This section lists individual incoming requests for ad slot reservations on specific signage locations. Each card within this panel includes metadata such as location ID, requestor name (i.e., client user), timestamp of request, and a visual preview of the signage location (image or placeholder). A "See Details" button invokes a detailed modal, providing booking parameters and moderation status.

Finally, the interface includes a "Campaign Requests" section summarizing full campaign bids from client users. Each entry details the campaign name, number of requested signage locations, total ads proposed and includes an actionable link to evaluate or approve the campaign request.

Figures 3D, 3E:
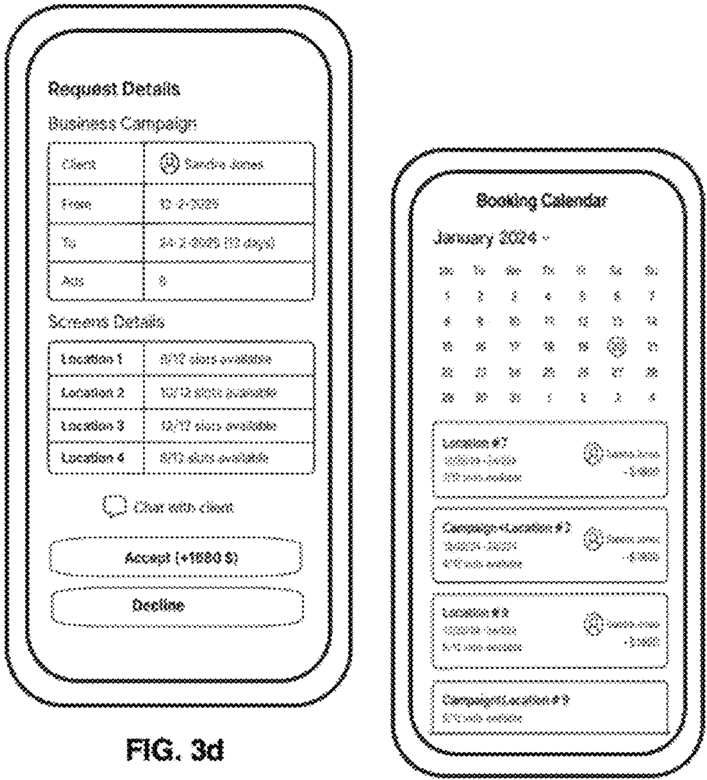

As shown in FIG. 3*d*, a detailed campaign request view, invoked upon selection of a campaign or booking request. This interface is structured into two main segments: general campaign details and screen-specific slot availability. In the 'General Details' section, data such as the client identity (e.g., "Sandra Jones"), campaign start and end dates, and total number of ads requested are retrieved from the campaign cart and rendered for host evaluation. The duration (e.g., "12 days") is auto computed based on input dates. The 'Screens Details' section includes a tabular layout listing all signage locations requested under the campaign. Each row includes a location identifier and a live update of slot availability (e.g., "8/12 slots available"). These metrics are served from the slot reservation layer of the campaign allocation engine (150).

At the bottom of the interface, the dashboard provides interaction buttons: A "Chat with Client" button allows real-time communication via the host-client messaging module. An "Accept" button, which triggers the transaction finalization module and confirms slot allocation, with the computed payout dynamically displayed (e.g., "+1680 $"). A "Decline" button which terminates the request and frees up temporarily held slots for other campaigns. All actions from this interface are logged and synchronized with the centralized campaign ledger for auditability and future analytics.

As shown in FIG. 3*e*, a calendar-based booking management interface is provided. This may be accessible to both client and host users on their respective devices. The calendar panel allows users to navigate through monthly views to select campaign dates. The system (100) integrates with the allocation engine, (150) which aligns selected dates with slot availability and bid schedules. As can be seen below the calendar, dynamically populated campaign cards are displayed for the users. Each card encapsulates metadata including signage location identifier, campaign name, booking range (e.g., "12/22/24-24/2/24"), current slot occupancy (e.g., "7/12 slots available"), and monetary offer or bid amount (e.g., "$1800"). These values are aggregated from the campaign allocation engine (150) and real-time bidding module (140).

The dashboard also displays client names alongside location entries, with authenticated user profile picture or user avatars generated by the host-client interaction layer. Each campaign-location pair is treated as a discrete unit of campaign orchestration and is assigned a unique tracking ID. Slot availability is monitored via the slot management engine, which restricts double-booking and enables partial booking visibility based on host preferences. The interface also serves as a navigable log of upcoming campaigns and booking densities, offering hosts and clients a consolidated visual to optimize planning, avoid overlaps, and evaluate revenue projections.

The central server (40) controls the scheduling and distribution of ads. The central server (40) is configured to perform the function of an advertisement management and control. The one or more advertisers upload their content to the system (100), select target locations, and schedule their advertisement slots. The advertisers need to purchase the required time slots by making payment using suitable payment mode. The advertisers may also subscribe in a weekly or monthly pattern.

A database may be associated with the central server (40) to store all relevant information such as advertiser profiles, advertisement content, time slot data, foot traffic statistics, and pricing models. It maintains historical data and updates real-time data related to advertisements, device performance, and audience engagement. The central server (40) acts as the central controller that facilitates communication between the database and the various signage devices located in different stores. It processes and sends the necessary advertisement content, scheduling instructions, and other updates to the appropriate display screens. The central server (40) may also be configured to retrieve foot traffic analysis data to thereby monitor the performance of advertisements in real-time.

FIG. 4*a*-4*f* illustrates various client-side graphical user interfaces (GUIs) that facilitate real-time interaction between advertisers and signage hosts, selection of signage locations, and filtering of results based on contextual parameters. These interfaces are rendered by the client-side campaign management module in coordination with the central server (40).

Figure 4A:
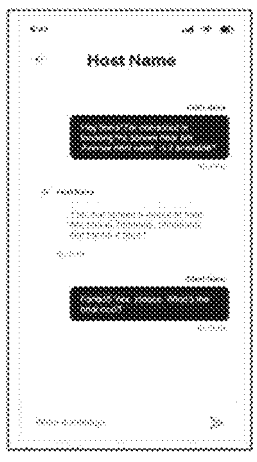
FIGS. 4*a*-4*f* illustrate various dashboard interfaces displayed on the client user devices, according to an exemplary embodiment of the present invention disclosure.

As shown in FIG. 4*a*, the system (100) includes a live chat messaging interface between a client user and a host user (signage host). This interface is enabled via the host-client interaction module and supports two-way communication. The chat log reflects timestamped messages from both parties, including inquiries about screen availability and booking confirmations.

In the depicted example, the client user initiates a booking query, and the host provides a response confirming availability for a specified duration. This exchange allows clients to receive instant confirmations and pricing, reducing latency in booking workflows and supporting informed decision-making. The interface also includes a text input field and a send control to continue the conversation.

Figure 4B:
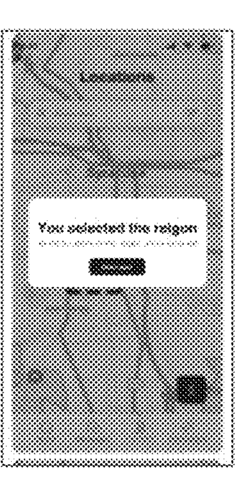

FIG. 4*b* presents a regional selection modal superimposed on a digital map view. When the client users, via their respective client user devices, select a geographic area, the interface highlights and aggregates all available signage locations within the selected region.

The system (100) employs a draw-to-select or tap-to-select mechanism from the geolocation-based display mapping engine to detect user input. The confirmation modal confirms the region selection with an option to proceed. This interaction simplifies large-scale campaign planning by allowing advertisers to bulk-select signage in dense urban clusters.

Figure 4C:

FIG. 4*c* illustrates a filter search interface that overlays the geographic signage display map. The filter tool enables clients to refine signage search results based on user-defined criteria retrieved via the filtering assistant module.

The available filters may include: industry type or category (e.g., food & beverage, fashion, technology), selectable via a dropdown; traffic-based sorting: high-to-low or low-to-high foot traffic, hardware capability indicators, such as whether the signage unit is a smart TV. Once selected, filters are submitted via a control button, and matching results are presented in the list view. These filtering preferences are matched against host metadata stored in the central repository and pre-processed via the server-side analytics engine.

Figure 4D:
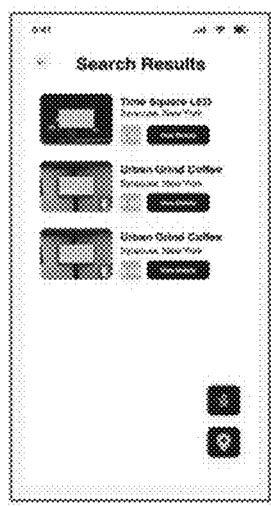

FIG. 4*d* shows the final search results interface (540), which displays a list of signage units that match the client's selected filters and region. Each entry in the list includes signage metadata such as name (e.g., "Time Square LED"), location (e.g., "Syracuse, New York"), a visual image of the signage unit (542), pricing (e.g., "$40"), and a "View Details" control (544) that enables the client to initiate a booking or view more technical data. Floating action buttons (546) are displayed at the bottom-right corner, allowing the user to toggle between map view and cart interface. These features are integrated with the campaign cart module and visual mapping engine, respectively.

Figure 4E:
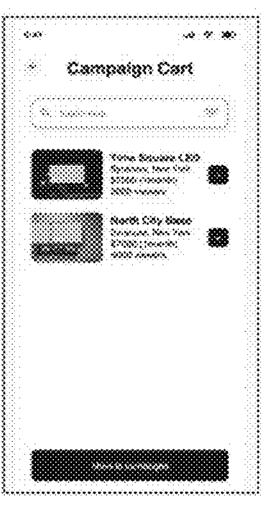
Figure 4F:
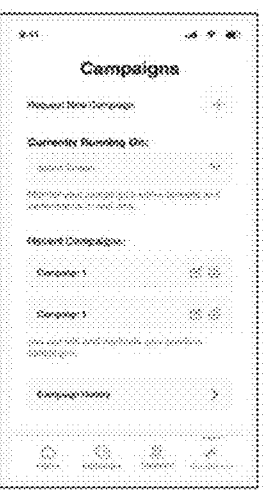

FIG. 4*e*-4*f* illustrates two client-facing interfaces related to campaign aggregation and management. These interfaces enable advertisers to manage selected signage units during planning and monitor campaign execution post-launch, all within a unified application environment.

FIG. 4*e* shows the Campaign Cart interface. This module functions as a temporary holding and planning space for signage selections made during the location and filter phases. Each signage unit added to the cart is displayed along with key attributes including the signage name, location, monthly cost, estimated viewership, and a thumbnail image. Clients may remove items using the associated action button or proceed to campaign setup using the "Move to campaigns" control at the bottom of the screen. A search bar at the top allows users to find specific signage entries within the cart based on location, keyword, or other identifiers. The campaign cart module is dynamically updated in real time and reflects pricing and availability based on server-side slot validations. This module also calculates aggregate budget impact as signage is added or removed, providing advertisers with a transparent planning experience.

FIG. 4*f* depicts the Campaign Management Dashboard, which allows users to initiate new campaigns, monitor existing ones, and duplicate or revise past campaigns. A top control enables the creation of a new campaign, while a dropdown selector allows the user to monitor campaigns running on specific screens. Performance metrics such as impressions, foot traffic, and engagement rates are retrievable from this view in real time. Below the live campaign controls, a list of recent campaigns is displayed. Each entry includes options to edit or duplicate the campaign, thereby enabling advertisers to reuse successful configurations. A navigation control to access full campaign history is also included. This dashboard is integrated with the analytics engine and attribution module, ensuring consistency across campaign data logs and performance evaluations.

Collectively, these interfaces (FIGS. 3*a*-3*e* and 4*a*-4*f*) enhance smart and intelligent campaign orchestration by offering a structured, visual approach to planning and execution, while minimizing friction across booking, budgeting, and monitoring workflows.

FIGS. 5*a-e* illustrate calculation of an advertisement price across a distributed network of digital signage screens. In one embodiment, the system (100) implements a computer-implemented method for calculating an advertisement price for campaign deployment across a distributed network of digital signage screens. The method is initiated via the graphical user interface rendered on the client user device (10), through which the advertiser inputs a set of campaign configuration parameters. These include a predefined foot traffic range corresponding to the selected signage location, a screen size category, a desired advertisement slot density (number of ads per minute), and one or more optional advertising features. Upon receiving these selections, the system (100) retrieves associated values from lookup tables stored in server-accessible memory. Specifically, it fetches a base traffic price linked to the selected foot traffic range, a screen size multiplier, and an ad density multiplier. For each optional feature such as sound enablement, real-time analytics, or continuous playback, a percentage-based cost increment is applied, and a cumulative feature multiplier is calculated as 1 plus the sum of selected feature percentages.

To illustrate, consider an example where the client selects a signage location with monthly foot traffic in the range of 5,000-9,999, resulting in a base traffic price of $85. The signage screen size is 55 inches, corresponding to a screen size multiplier of 1.125. The client requests 6 advertisements per minute, each 10-seconds in duration, leading to an ad density multiplier of 2.0. The optional features selected include sound enabled (5%), live analytics (15%), and continuous playtime (5%), resulting in a cumulative feature multiplier of 1.25. The final advertisement price is calculated using the formula:

$$(\text{FinalPrice})=(\text{BaseTrafficPrice})\times(\text{ScreenSizeMultiplier})\times(\text{AdDensityMultiplier})\times(\text{FeatureMultiplier})=(85)\times(1.125)\times(2.0)\times(1.25)=(\$238.13).$$

The system (100) then outputs this computed price to the client user device (10) in real time, thereby enabling the advertiser to evaluate pricing implications before finalizing campaign deployment.

Thus, the system (100) facilitates hosts to rent their one or more digital signage devices (30), each signage device needs to be configured to display multiple advertisements as required by the clients in desired time slots and locations. The one or more electronic signage devices are configured across a network and each signage device (30) is communicably connected to the central server (40) for displaying the advertisements. These one or more electronic signage devices include digital screens, LED boards, and digital signage devices (30) installed in various businesses such as supermarkets, malls, gyms, cafes, and salons at various geographical locations. Overall, the system (100) is designed to streamline the advertisement management process, from content scheduling and real-time updates to in-depth performance analytics, thereby offering a versatile and data-driven approach for advertisers and business owners alike.

It will be understood by those skilled in the art that the figures are only a representation of the structural components and process steps that are deployed to provide an environment for the solution of the present invention disclosure discussed above and does not constitute any limitation. The specific components and method steps may include various other combinations and arrangements than those shown in the figures.

The term exemplary is used herein to mean serving as an example. Any embodiment or implementation described as exemplary is not necessarily to be construed as preferred or advantageous over other embodiments or implementations. Further, the use of terms such as including, comprising, having, containing and variations thereof, is meant to encompass the items/components/process listed thereafter and equivalents thereof as well as additional items/components/process.

Although the subject matter is described in language specific to structural features and/or acts, it is to be understood that the subject matter defined in the claims is not necessarily limited to the specific features or process as described above. In fact, the specific features and acts described above are disclosed as mere examples of implementing the claims and other equivalent features and processes which are intended to be within the scope of the claims.

What claimed is:

1. A computer-implemented system for managing location-based digital advertising across a distributed network of digital signage devices, the system comprising:

a client-side campaign management module, executable on a client user device, configured to receive and transmit advertising campaign parameters including target demographics, budget constraints, and preferred locations;

a plurality of digital signage devices, each digital signage device comprising:

(a) a display screen (b) a digital display controller;

(c) an occupancy sensor configured to detect real-time occupancy data indicative of real-time foot traffic density in the vicinity of the digital signage device; and (d) a network interface configured to transmit the real-time occupancy data to a host user device and a central server;

a host device registration module, executable on one or more host user devices, configured to register a digital signage device by transmitting a corresponding device identifier, geolocation data, screen specifications, and real-time occupancy data received from one or more digital signage devices to the central server;

a bidding module, operable on the host user device, configured to:

(a) receive bid requests in real time;

(b) locally pre-process occupancy and engagement signals; and (c) transmit filtered bid responses to the central server;

the central server, comprising a non-transitory memory storing instructions and a processor, the central server further comprising:

a geolocation-based display mapping engine, configured to render, on a graphical user interface, a map-based visualization of available digital signage devices based on real-time occupancy status and location metadata;

a campaign allocation engine configured to:

(a) analyze incoming campaign parameters;

(b) retrieve real-time availability and historical viewer impression data from the plurality of digital signage devices;

(c) match campaigns to the plurality of digital signage devices using a non-linear optimization model that accounts for device-specific responsiveness and demographic affinity scores;

(d) generate a dashboard interface for display on a client user device, the dashboard interface displaying indications of a plurality digital signage devices matching a campaign, wherein a visibility of each indication is prioritized according to one or more criteria;

(e) receive real-time occupancy data detected using respective occupancy sensors of the plurality digital signage devices matching the campaign; and (f) dynamically reprioritize, in real-time, the visibility of each indication of the plurality of digital signage devices matching the campaign in the dashboard based at least in part on the received real-time occupancy data;

a dynamic pricing engine, configured to:

(a) calculate a per-impression cost based on real-time traffic density derived from a plurality of sources, the plurality of sources comprising the occupancy sensors associated with the plurality of digital signage devices, historical engagement analytics, and predictive AI models; and (b) autonomously adjust pricing thresholds using reinforcement learning algorithms to optimize for advertiser engagement and host yield;

a centralized moderation subsystem, including a machine learning classifier trained on historical rejection data, configured to automatically approve or flag campaign placements based on content policy compliance.

2. The system of claim 1, wherein the campaign allocation engine further comprises a budget and reach tracker configured to update in real-time as digital signage devices are selected by a client user on respective client user device.

3. The system of claim 1, wherein the centralized moderation subsystem is further configured to prevent account transactions of the host user device and the client user device without administrative approval, and to perform automated pre-screening of an advertising content using at least one of: (i) rule-based filters, and (ii) AI-based moderation algorithms prior to said approval.

4. The system of claim 1, wherein the geolocation-based display mapping engine is further configured to provide a list view toggle, sort functionality based on traffic data, host ratings, pricing, and a heatmap visualization overlay to assist in identifying optimal digital signage devices based on user-defined filtering criteria.

5. The system of claim 1, wherein the central server further comprises an inventory optimization module configured to reprioritize digital signage devices in real time based on live engagement metrics, wherein the reprioritization includes adjusting bidding visibility or display frequency, including featuring high-performing or compensated host screens more prominently, including on home page or top results, based on factors including, but not limited to, additional fees, subscriptions, incentives, and other forms of compensation or platform-determined criteria.

6. The system of claim 1, wherein the central server further comprises a performance feedback module configured to correlate occupancy sensor-derived foot traffic data with campaign interaction events to compute engagement performance metrics.

7. The system of claim 1, wherein the dynamic pricing engine is further configured to calculate an advertisement slot cost based on one or more host-defined parameters including but not limited to display screen size, ad display capacity, display screen location, and historical or real-time performance data, and to enable optional host-defined custom pricing per slot.

8. The system of claim 1, wherein the bidding module is further configured to allocate advertisement slots based on predefined criteria including but not limited to bid value, campaign relevance to display location, and slot availability in real-time.

9. The system of claim 1, wherein attribution metrics for each digital signage device include but not limited to time-synced occupancy data, advertisement display logs, user engagement events including QR code scans and device interactions, and other measurable indicators, and wherein the bidding module is further configured to aggregate said attribution metrics to compute a campaign-specific engagement score.

10. The system of claim 1, wherein the host user device is configured to prompt host users during digital signage device registration to input demographic characteristics of the typical viewer base including but not limited to age group, gender, ethnic profile, occupation, and income level, and wherein the host device registration module is further configured to use said demographic characteristics to generate a demographic profile and diversity score for the digital signage device.

11. The system of claim 1, wherein the client user device comprises a filtering guide enabling campaign targeting based on demographic profiles and diversity scores, and wherein the filtering guide enables clients to adjust location selection preferences based on desired audience traits or diversity parameters.

12. The system of claim 1, wherein the host user device includes a structured lead submission tool configured to allow host users to propose campaign-relevant leads to clients, and further configured to facilitate client-generated feedback, including tips or reviews, based on a quality or usefulness of the proposed leads.

13. The system of claim 1, wherein the client user device is configured to provide a campaign cart that tracks a cumulative estimated cost and impression count of selected digital signage devices.

14. The system of claim 1, wherein each occupancy sensor comprises at least a radar-based sensor, wherein each digital display controller is configured to dynamically adjust an advertisement display frequency based on real-time foot traffic data captured by the occupancy sensor.

15. The system of claim 1, wherein the central server further comprises a location analytics module configured to collect and process data indicative of return visitor rates, demographic breakdowns, and traffic trends at each digital signage device.

16. The system of claim 1, wherein the geolocation-based display mapping engine is further configured to provide graphical tools comprising draw-to-select and multi-tap functionality for bulk selection of digital signage devices on the map-based visualization.

17. The system of claim 1, wherein the central server is configured to process client user-submitted advertisement content using pattern recognition models to predict viewer engagement levels and estimated reach.

18. The system of claim 1, wherein the central server further comprises an AI-based recommendation engine configured to analyze campaign parameters including budget, impression targets, and audience preferences, and to generate prioritized digital signage device suggestions aligned with optimal viewer profiles or campaign goals.

19. The system of claim 1, wherein the central server is configured to present advertiser selections, performance results, and bidding history on the client user device and the host user device via a corresponding interactive campaign dashboard facilitating real-time metrics and visual analytics.

* * * * *